United States Patent [19]

Skaletzky

[11] 3,928,596

[45] Dec. 23, 1975

[54] PHARMACEUTICAL COMPOSITIONS OF 5,6-DIALKOXY-2-AMINOBENZIMIDAZOLES AND METHOD FOR TREATING HYPERTENSION

[75] Inventor: Louis L. Skaletzky, Kalamazoo, Mich.

[73] Assignee: The Upjohn Company, Kalamazoo, Mich.

[22] Filed: May 28, 1974

[21] Appl. No.: 473,683

Related U.S. Application Data

[63] Continuation of Ser. No. 361,277, May 17, 1973, abandoned.

[52] U.S. Cl. .............................................. 424/273
[51] Int. Cl.[2] ...................................... A61K 31/415
[58] Field of Search ................................... 424/273

[56] References Cited
UNITED STATES PATENTS 3,705,175  12/1972  Magdanyi et al. .................. 424/273

Primary Examiner—Albert T. Meyers
Assistant Examiner—Daren M. Stephens
Attorney, Agent, or Firm—John J. Killinger; Roman Saliwanchik

[57] ABSTRACT

Novel compounds of formula:

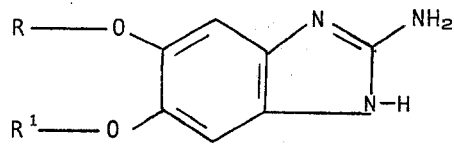

and their pharmaceutically acceptable acid addition salts wherein R and $R^1$ are each lower alkyl are disclosed as useful for the treatment of hypertension in mammals, including humans.

5 Claims, No Drawings

PHARMACEUTICAL COMPOSITIONS OF 5,6-DIALKOXY-2-AMINOBENZIMIDAZOLES AND METHOD FOR TREATING HYPERTENSION

CROSS REFERENCE TO RELATED APPLICATIONS

This application is a continuation of application Ser. No. 361,277, filed May 17, 1973, now abandoned.

BACKGROUND OF THE INVENTION

1. Field of the Invention

The invention concerns novel 5,6-dialkoxy-2-aminobenzimidazoles and their use in preparing therapeutic compositions for the treatment of hypertension in mammals.

2. Description of the Prior Art

Belgian Pat. No. 768,300 of June 9, 1971 discloses 2-acetamido-5,6-dialkoxybenzimidazoles and their use as hypotensive agents.

In general, a large number of 2-acylamidobenzimidazoles are known to be useful hypotensive agents. However, the corresponding 2-aminobenzimidazoles have not been previously known to possess this useful property. In fact, a number of 2-aminobenzimidazoles corresponding to known hypotensive 2-acylamidobenzimidazoles do not significantly lower blood pressures in mammals. For example, although 2-acetamido-5,6-dimethylbenzimidazole possesses hypotensive properties (Belgian Pat. No. 768,300), the corresponding 2-amino-5,6-dimethylbenzimidazole does not. Similarly, Belgian Pat. No. 768,300 discloses that 2-acetamido-4,7-dialkoxybenzimidazoles possess hypotensive properties. However, the corresponding 2-amino-compound, for example, 2-amino-4,7-dimethoxybenzimidazole, does not significantly reduce blood pressures in mammals.

Subsequent to our invention, 2-amino-5,6-dimethoxybenzimidazole was disclosed as an intermediate for hypotensive 2-acylamidobenzimidazoles in Bellasio et al., Farm. Ed. Sci., 28(2), 164–82 (1973).

In view of the above, my finding that the 2-amino-5,6-dialkoxybenzimidazoles are useful for the treatment of hypertension in mammals is unexpected and surprising.

SUMMARY OF THE INVENTION

The invention comprises compounds selected from those of formula:

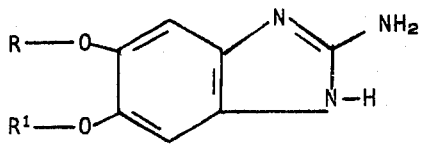

(I)

and the pharmaceutically acceptable acid addition salts thereof wherein R and $R^1$ are each lower alkyl.

The term "lower alkyl" is used herein to mean alkyl having from 1 to 4 carbon atoms, inclusive. Illustrative of lower alkyl are methyl, ethyl, propyl, butyl, and isomeric forms thereof.

The invention also comprises therapeutic compositions containing the compounds (I) or the pharmaceutically acceptable acid addition salts thereof as the essential active ingredient and methods of treating hypertension in mammals, including humans, with effective amounts of the compounds (I).

The compounds and compositions of the invention are useful for treating hypertension in mammals, including humans.

DETAILED DESCRIPTION OF THE INVENTION

The compounds (I) of the invention are conveniently prepared by the method of Joseph, J. Med. Chem., 6, 601, (1963). In general, the method comprises condensing an appropriate o-phenylenediamine of formula:

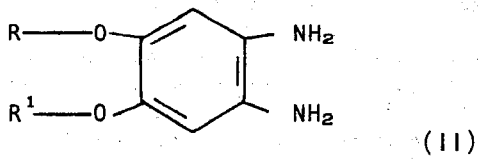

(II)

wherein R and $R^1$ are as defined above; with cyanogen bromide to obtain the hydrobromide salt of the corresponding compound (I). The hydrobromide salt may be separated by conventional means when desired or the reaction mixture may be basified with ammonium hydroxide or other strong bases to obtain the compound (I) free base.

The compounds (I) of the invention can exist in either the free base form or in the form of an acid addition salt. The acid addition salts are prepared by reacting the free base (I) with a stoichiometric proportion of an appropriate acid such as hydrochloric acid. The method is well known to those skilled in the art and may be carried out in aqueous or non-aqueous media such as ethanol, ether, ethyl acetate and the like.

The pharmaceutically acceptable acid addition salts may be used for the same purposes as the free base. Illustrative of pharmaceutically acceptable acid addition salts are those formed upon reaction of the compounds (I) with hydrochloric acid, hydrobromic acid, sulfuric acid, phosphoric acid, acetic acid, lactic acid, citric acid, succinic acid, benzoic acid, salicylic acid, pamoic acid, cyclohexanesulfamic acid and the like.

Starting o-phenylenediamines (II) employed to prepare the compounds (I) of the invention are well known and are illustrated by 1,2-diamino-4,5-dimethoxybenzene; 1,2-diamino-4,5-diethoxybenzene; 1,2-diamino-4,5-diisopropoxybenzene and 1,2-diamino-4,5-dibutoxybenzene. The compounds (II) are conveniently prepared by reduction of the corresponding 1,2-dinitro-4,5-dialkoxybenzenes which are also generally well known.

PREPARATION 1

1,2-Diamino-4,5-dimethoxybenzene

A Parr low pressure hydrogenation apparatus is charged with 10 grams (0.044 mole) of 1,2-dinitro-4,5-dimethoxybenzene, 1.0 grams of platinum oxide and 150 ml. of absolute ethanol. While continually agitating the reaction mixture, hydrogenation is carried out for one hour under a hydrogen pressure of from 2 to 3 atmospheres. At the end of this period, excess hydrogen is vented and the reaction mixture is filtered to remove solid residues. The filtrate is a solvent mixture containing crude 1,2-diamino-4,5-dimethoxybenzene.

The following examples describe the manner and process of making and using the invention and set forth the best mode contemplated by the inventor of carrying out the invention but are not to be construed as limiting.

EXAMPLE 1

An appropriate reaction vessel is charged with the crude reaction mixture containing 1,2-diamino-4,5-dimethoxybenzene obtained in Preparation 1, supra. A solution of 4.7 gms. (0.044 mole) of cyanogen bromide in 50 ml. of ethanol is added and the resulting mixture stirred overnight at room temperature, under a nitrogen gas atmosphere. At the end of this period solvent is removed under reduced atmospheric pressure and the residue extracted with isopropanol. The residue is then recrystallized from a mixture of methanol-ether to give 3.15 gms. (26% of theory based on starting 1,2-dinitro-4,5-dimethoxybenzene) of 2-amino-5,6-dimethoxybenzimidazole hydrobromide in the form of a pink solid, M.P. 280°C. to 281°C. (dec.). Structure of the product is confirmed by elemental analysis.

Similarly, following the above procedure but replacing the reaction mixture containing 4,5-diamino-1,2-dimethoxybenzene as used therein with 1,2-diamino-4,5-dibutoxybenzene there is obtained 2-amino-5,6-dibutoxybenzimidazole hydrobromide.

EXAMPLE 2

Repeating the procedure of Example 1., supra. but treating the solution obtained upon dissolving the extracted residue in the methanol-ether mixture with sufficient ammonium hydroxide to give a pH of circa 4-6, there is obtained upon recrystallization 2-amino-5,6-dimethoxybenzimidazole free base.

This invention relates also to pharmaceutical dosage unit forms for systemic administration (oral and parenteral administration) which are useful in treating hypertension in mammals, including humans. The term "dosage unit form" as used in this specification and in the claims refers to physically discrete units suitable as unitary dosages for mammalian subjects, each unit containing a predetermined quantity of the essential active ingredient, i.e.; a compound (I) or a pharmaceutically acceptable acid addition salt thereof, calculated to produce the desired effect in combination with the required pharmaceutical means which adapt said ingredient for systemic administration. Examples of dosage unit forms in accordance with this invention are tablets, capsules, orally administered liquid preparations in liquid vehicles, sterile preparations in liquid vehicles, sterile preparations in liquid vehicles for intramuscular and intravenous administration, suppositories, and sterile dry preparations for the extemporaneous preparation of sterile injectable preparations in a liquid vehicle. Solid diluents or carriers for the solid oral pharmaceutical dosage unit forms are, for example, selected from the group consisting of lipids, carbohydrates, proteins and mineral solids, for example, starch, sucrose, kaolin, dicalcium phosphate, gelatin, acacia, corn syrup, corn starch, talc and the like. Capsules both hard and soft are formulated with suitable diluents and excipients, for example, edible oils, talc, calcium carbonate and the like and also calcium stearate. Liquid preparations for oral administration are prepared in water or aqueous vehicles which advantageously contain suspending agents, for example, sodium carboxymethylcellulose, methylcellulose, acacia, polyvinyl pyrrolidone, polyvinyl alcohol and the like. In the case of injectable forms, they must be sterile and must be fluid to the extent that easy syringeability exists. Such preparations must be stable under the conditions of manufacture and storage, and ordinarily contain, in addition to the basic solvent or suspending liquid, preservatives in the nature of bactericidal and fungicidal agents, for example, parabens, chlorobutanol, benzyl alcohol, phenol, thimerosal, and the like. In many cases it is preferable to include isotonic agents, for example, sugars or sodium chloride. Carriers and vehicles include vegetable oils, ethanol and polyols, for example, glycerol, propylene glycol, liquid polyethylene glycol, and the like. Any solid preparations for subsequent extemporaneous preparation of sterile injectable preparations are sterilized, preferably by exposure to a sterilizing gas, for example, ethylene oxide. The aforesaid carriers, vehicles, diluents, excipients, preservatives, isotonic agents and the like constitute the pharmaceutical means which adapt the preparations for systemic administration.

The effective amount of a compound (I) or the pharmaceutically acceptable acid addition salts thereof required for administration to a mammal suffering from hypertension is within the range of from about 1 mg. per kilogram of body weight to about 50 mg. per kilogram of body weight of the recipient, daily. Preferably, the amount is within the range of from about 2.0 mg. per kilogram of body weight to about 25.0 mg. per kilogram of body weight on a daily basis.

The pharmaceutical dosage unit forms are prepared in accordance with the preceding general description to provide from about 25 to about 250 mg. of the essential active ingredient per dosage unit form.

Advantageously the compounds of the invention (I) and pharmaceutically acceptable acid addition salts thereof may also be combined with sedatives and tranquilizers such as phenobarbital, pentobarbital, chloral hydrate, chlorpromazine, thioridazine, diazepam and the like when sedation or tranquilization of the mammal being treated is also desired.

Combinations with other antihypertensive agents such as hydralazine hydrochloride, hexamethonium bromide, mecamylamine hydrochloride, phenoxybenzamine hydrochloride, guanethidine sulfate, methyldopa and the like may be advantageous in over-coming developing tolerance or "resistance" to such agents.

Combinations with antidepressant agents such as d-amphetamine, pheniprazine hydrochloride, tranylcypromine, imipramine, desipramine, amitriptyline, nortriptyline, protriptyline and methylphenidate hydrochloride may be made when considered desirable.

Combinations with diuretic agents such as ethoxzolamide, hydrochlorothiazide, trichlormethiazide, acetazolamide, chlorthalidone, triamterene, quinethazone, cyclothiazide, chlorothiazide, benzthiazide and the like may also be advantageous in the treatment of hypertension.

Illustratively, in combination with the compounds of the invention, the other active compounds are administered with dosages as indicated: anti-anxiety and tranquilizing agents: chlorpromazine (5–50 mg.), thioridazine (5–100 mg.), haloperidol (0.5–5 mg.), meprobamate (100–400 mg.), ectylurea (100–300 mg.), chlordiazepoxide (5–50 mg.) and diazepam (2–15 mg.); antidepressants such as amitriptyline hydrochloride (10–50 mg.), methylphenidate hydrochloride (5–20 mg.), d-amphetamine sulfate (2–15 mg.) and methamphetamine hydrochloride (2–15 mg.); antihypertensive and diuretic agents such as hydrochlorothiazide (15–50 mg.), hydralazine (10–100 mg.), methyldopa (100–250 mg.), guanethidine (10–50 mg.), ethoxzolamide (50–150 mg.) and reserpine (0.05–1 mg.), barbiturates such as phenobarbital (8–60 mg.) butabarbital (8–60 mg.) and amobarbital (16–120 mg.); analgesics such as aspirin (150–600 mg.) and acetaminophen (150–600 mg.).

The following examples illustrate the compositions and uses of the compounds of the invention. For brevity and convenience, the term "essential active ingredient" has been employed in each of the Examples 3 through 12 to mean 2-amino-5,6-dimethoxybenzimidazole hydrobromide.

EXAMPLE 3

One thousand tablets for oral use, each containing 250 mg. of essential active ingredient are prepared from the following ingredients:

| | |
|---|---|
| essential active ingredient | 250 Gm. |
| dicalcium phosphate | 150 Gm. |
| methylcellulose, U.S.P.(15 cps) | 6.5 Gm. |
| talc | 20 Gm. |
| calcium stearate | 2.5 Gm. |

The essential active ingredient and dicalcium phosphate are mixed well, granulated with 7.5% aqueous solution of methylcellulose, passed through a No. 8 screen and dried carefully. The dried granules are passed through a No. 12 screen, mixed with the talc and stearate and compressed into tablets. These tablets are useful in the treatment of hypertension in adult humans at a dose of 1 tablet two or three times a day.

EXAMPLE 4

One thousand two-piece hard gelatin capsules for oral use, each capsule containing 25 mg. of essential active ingredient are prepared from the following ingredients:

| | |
|---|---|
| essential active ingredient | 25 Gm. |
| lactose, U.S.P. | 100 Gm. |
| starch, U.S.P. | 10 Gm. |
| talc, U.S.P. | 5 Gm. |
| calcium stearate | 1 Gm. |

The finely powdered materials are mixed thoroughly, then filled into hard gelatin capsules of appropriate size.

A satisfactory clinical response is obtained in adults showing hypertension with 1 capsule six times a day.

EXAMPLE 5

One-piece soft elastic capsules for oral use, each containing 50 mg. of essential active ingredient, are prepared in the usual manner by first dispersing the powdered active material in sufficient corn oil to render the material capsulatable.

One capsule four times a day is useful in the treatment of moderate hypertension in adult humans.

EXAMPLE 6

An aqueous oral preparation containing in each teaspoonful (5ml.) 50 mg. of essential active ingredient hydrochloride is prepared from the following:

| | |
|---|---|
| essential active ingredient (hydrochloride) | 100 Gm. |
| methylparaben, U.S.P. | 7.5 Gm. |
| propylparaben, U.S.P. | 2.5 Gm. |
| saccharin sodium | 12.5 Gm. |
| glycerin | 3,000 ml. |
| tragacanth powder | 10 Gm. |
| orange oil flavor | 10 Gm. |
| F.D. and C. orange dye | 7.5 Gm. |
| deionized water, q.s. to | 10,000 ml. |

The foregoing aqueous preparation is useful in the treatment of adults for hypertension at a dose of one teaspoonful four times a day.

EXAMPLE 7

One thousand tablets for oral administration, each containing 25 mg. of essential active ingredient and 16.2 mg. of phenobarbital are prepared from the following ingredients:

| | |
|---|---|
| essential active ingredient, micronized | 25 Gm. |
| phenobarbital | 16.2 Gm. |
| lactose | 150 Gm. |
| starch | 15 Gm. |
| magnesium stearate | 1.5 Gm. |

The ingredients are thoroughly mixed and slugged. The slugs are broken down by forcing through a screen and the resulting granules are then compressed into tablets.

These tablets are useful in treating excited, hypertensive mammals such as dogs at a dose of 1 to 3 tablets, depending on the weight of the animal and its condition.

EXAMPLE 8

A sterile aqueous suspension suitable for intramuscular injection and containing in each milliliter 100 mg. of essential active ingredient is prepared from the following ingredients:

| | |
|---|---|
| essential active ingredient | 10 Gm. |
| polyethylene glycol 4000, U.S.P. | 3 Gm. |
| sodium chloride | 0.9 Gm. |
| polysorbate 80, U.S.P. | 0.4 Gm. |
| sodium metabisulfite | 0.1 Gm. |
| methylparaben, U.S.P. | 0.18 Gm. |
| propylparaben, U.S.P. | 0.02 Gm. |
| water for injection, q.s. to | 100 ml. |

The above sterile injectable is useful in the treatment of hypertension at a dose of 1 or 2 ml. administered daily.

EXAMPLE 9

One thousand suppositories, each weighing 2.5 Gm. and containing 250 mg. of essential active ingredient, are prepared from the following ingredients:

| | |
|---|---|
| essential active ingredient | 250 Gm. |
| propylene glycol | 165 Gm. |
| polyethylene glycol (PEG) 4000 q.s. | 2,500 Gm. |

The essential active ingredient is added to the propylene glycol and the mixture milled until uniformly dispersed. The PEG 4000 is melted and the propylene glycol dispersion added. The suspension is poured into molds and allowed to cool and solidify.

These suppositories are useful in the treatment of hypertension in mammals at a dose of 1 suppository administered rectally twice a day.

EXAMPLE 10

One thousand hard gelatin capsules for oral use, each containing 50 mg. of essential active ingredient and 25 mg. of hydrochlorothiazide, are prepared from the following ingredients:

| | |
|---|---|
| essential active ingredient, micronized | 50 Gm. |
| hydrochlorothiazide | 25 Gm. |
| starch | 125 Gm. |
| talc | 25 Gm. |
| magnesium stearate | 1.5 Gm. |

One capsule four times a day is useful in the relief of moderate hypertension in adult humans.

EXAMPLE 11

Ten thousand scored tablets for oral use, each containing 50 mg. of essential active ingredient and 0.08 mg. of reserpine, are prepared from the following ingredients, using the procedure of Example 7, supra.:

| | |
|---|---|
| essential active ingredient micronized | 500 Gm. |
| reserpine | 0.8 Gm. |
| lactose | 1,500 Gm. |
| corn starch | 500 Gm. |
| talc | 500 Gm. |
| calcium stearate | 25 Gm. |

This combination of active materials is effective in reducing hypertension in adult humans. The dose is one-half to two tablets three to four times a day, depending on the severity of the condition.

EXAMPLE 12

Aqueous Suspension

An aqueous suspension for oral administration is prepared by suspending the essential active ingredient at a concentration of 5 mg./ml. in an aqueous solution containing 1% of sodium carboxymethylcellulose. This suspension is used for bringing about hypotensive effects in unanesthetized normotensive rats. The rats are prepared for measuring blood pressure directly from the aorta through a chronic indwelling cannula [method of Weeks and Jones, *Proc. Soc. Exptl. Biol. and Med.*, 104, 646, (1960)].

Employing groups of four rats each (average weight 285 to 365 grams), varying amounts of essential active ingredient are orally administered to the rats, and arterial blood pressure measurements obtained prior to, and at 4 hours and 24 hours after administration. The blood pressure measurements obtained and the reduction of blood pressure obtained at each dosage level are set forth in Table I below.

TABLE 1

| Oral Dose mg/kg | Rat No. | Rat Weight (gm) Initial | Rat Weight (gm) 24 hr | Initial B.P. mm Hg. | B.P.Change mm Hg 4 hr | B.P.Change mm Hg 24 hr |
|---|---|---|---|---|---|---|
| 50 | 137 | 305 | 300 | 124 | −12 | −18 |
| | 142 | 285 | 280 | 128 | −10 | − 2 |
| 50 | 147 | 280 | 270 | 136 | −10 | −24 |
| | 160 | 280 | 280 | 134 | −22 | −14 |
| | avg. | 288 | 283 | 131 | −14 | −15 |
| 25 | 06 | 420 | 420 | 136 | −26 | −28 |
| | 41 | 400 | 390 | 136 | −22 | −20 |

TABLE 1-continued

| Oral Dose mg/kg | Rat No. | Rat Weight (gm) Initial | Rat Weight (gm) 24 hr | Initial B.P. mm Hg. | B.P.Change mm Hg 4 hr | B.P.Change mm Hg 24 hr |
|---|---|---|---|---|---|---|
| | 43 | 325 | 330 | 140 | −10 | −14 |
| | 47 | 315 | 315 | 130 | −30 | −30 |
| | avg. | 365 | 364 | 136 | −22 | −23 |
| 12.5 | 162 | 320 | 315 | 128 | − 8 | − 8 |
| | 164 | 300 | 300 | 136 | −16 | −18 |
| | 170 | 295 | 290 | 134 | − 8 | −10 |
| | 174 | 305 | 305 | 132 | −14 | − 2 |
| | avg. | 305 | 303 | 133 | −12 | −10 |
| 6.25 | 187 | 290 | 285 | 138 | −18 | − 6 |
| | 189 | 290 | 285 | 136 | −10 | − 6 |
| 6.25 | 224 | 300 | 300 | 128 | −20 | −18 |
| | 229 | 290 | 290 | 144 | −12 | −14 |
| | avg. | 293 | 290 | 137 | −15 | −11 |
| 3.12 | 196 | 300 | 300 | 140 | −16 | −10 |
| | 215 | 294 | 290 | 130 | −14 | − 6 |
| | 219 | 300 | 295 | 134 | −18 | − 4 |
| | 227 | 290 | 285 | 140 | −16 | −12 |
| | avg. | 296 | 293 | 136 | −16 | − 8 |

The above Table I. points out the effectiveness of the essential active ingredient in reducing blood pressure in a mammal. A compound is deemed effective, which will reduce mean arterial pressures by at least 10 mm. of mercury. No toxic effects were noted in the test animals.

EXAMPLE 13

Following the procedure of the preceding Examples 3 to 12, inclusive, similar dosage forms are prepared by substituting an equivalent amount of the other inventive compounds or their acid addition salts, such as, for example, 2-amino-5,6-dimethoxybenzimidazole,
2-amino-5,6-diethoxybenzimidazole,
2-amino-5,6-diisopropoxybenzimidazole,
2-amino-5,6-dibutoxybenzimidazole and like compounds of the formula (I).

I claim:

1. A pharmaceutical dosage unit form adapted to systemic administration to obtain antihypertensive effects consisting essentially of an effective amount for said effects of a compound of the formula:

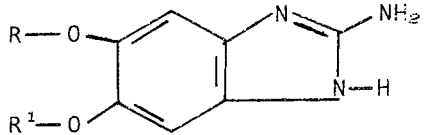

or a pharmaceutically acceptable acid addition salt thereof, wherein R and $R^1$ are each lower alkyl; in combination with pharmaceutical means selected from the group consisting of carriers, vehicles, diluents, excipients, preservatives, and isotonic agents which adapt the compound for systemic administration.

2. The composition of claim 1 wherein said compound is 2-amino-5,6-dimethoxybenzimidazole hydrobromide.

3. A method of obtaining antihypertensive effects in a mammal which consists essentially of administering systemically to said mammal a pharmaceutical dosage unit form supplying an effective amount for antihypertensive effect of a compound of formula:

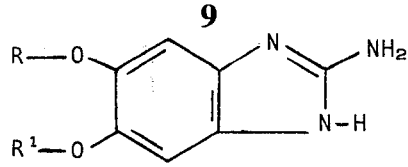
or a pharmaceutically acceptable acid addition salt thereof wherein R and R¹ are each lower alkyl.
4. The method of claim 3 wherein the amount of compound administered is within the range of from about 1 mg. per kg. to about 50 mg. per kg. of weight of said mammal, on a daily basis.
5. The method of claim 3 wherein said compound is 2-amino-5,6-dimethoxybenzimidazole hydrobromide.
* * * * *